US006715670B1

(12) United States Patent
Swiatek et al.

(10) Patent No.: US 6,715,670 B1
(45) Date of Patent: Apr. 6, 2004

(54) INTERACTIVE DISPENSE DENOMINATION ADJUSTMENT

(75) Inventors: Edward Raymond Swiatek, Concord, NC (US); Stephen Wesley Linn, Concord, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/552,348

(22) Filed: Apr. 19, 2000

(51) Int. Cl.[7] .................................... G06F 17/60

(52) U.S. Cl. .................................... 235/379; 235/7 R

(58) Field of Search .................................... 235/379, 385, 235/2, 4, 7 R, 23

(56) References Cited

U.S. PATENT DOCUMENTS

| | | | | | |
|---|---|---|---|---|---|
| 4,185,646 | A | * | 1/1980 | Woods et al. | 133/4 R |
| 4,191,999 | A | * | 3/1980 | Kashio | 235/7 R |
| 4,522,275 | A | * | 6/1985 | Anderson | 177/25 |
| 4,532,417 | A | * | 7/1985 | Nisimura et al. | 235/379 |
| 5,000,322 | A | * | 3/1991 | Goi | 235/379 |
| 5,105,364 | A | * | 4/1992 | Kawamura et al. | 364/478 |
| 5,256,862 | A | * | 10/1993 | Watanabe et al. | 235/379 |
| 5,756,977 | A | * | 5/1998 | Biss | 235/7 R |
| 6,021,883 | A | * | 2/2000 | Casanova et al. | 194/217 |
| 6,363,164 | B1 | * | 3/2002 | Jones et al. | 382/135 |

* cited by examiner

*Primary Examiner*—Daniel St.Cyr
(74) *Attorney, Agent, or Firm*—Karl O. Heese; Douglas A. Lashmit

(57) ABSTRACT

A system and method and programmed product interactively monitors the amount of cash present in a teller cash drawer while reducing the data input requirements of the teller. It allows a teller to comply with a consumers request for specific denominations while at the same time minimizing premature depletion of specific denominations of money. It corrects situations where a denomination is not an integral multiple of the next lower denomination thereby allowing a mix to be determined even when a lower denomination is depleted. The system and method including a programmed computer process presents a miscellaneous dialog field to a teller for handling commemorative and unusual denominations and the method allows dispensing from this amount as well as from the usual denominations.

6 Claims, 8 Drawing Sheets

INTERACTIVE DISPENSE DENOMINATION ADJUSTMENT

BACKGROUND OF THE INVENTION

1. Technical Field

The present invention relates to control of currency in a teller cash drawer and more specifically the control of denomination mix in such cash drawers from which money is manually and automatically dispensed and into which money is deposited.

2. Related Art

While dispensing an amount from a teller cash drawer, some banks require that the denominations within the cash drawer be monitored interactively by the computer controlling the teller workstation. This allows the institution to know not only the amount of cash present in a teller cash drawer, but the precise bill mix available for a transaction. While this helps the bank track teller cash positions more exactly, it can be a rather tiresome data entry task to require of a teller.

U.S. Pat. No. 4,611,286 by Nishimura et al. relates to a cash accounting system comprising a cash register and a cash dispenser that can be controlled by the cash register. Both the cash register and the cash dispenser have memories which keep track of the amount and denomination of the money remaining in their respective machine.

In order to assist the workstation operator such as a teller in controlling the denominations of cash in a cash drawer, a workstation may provide a display of a denomination mix of coins and bills to be returned to a consumer or customer as part of a transaction.

IBM Technical Disclosure Bulletin Volume 36, No. 6B, June 1993, Page 275 describes a prompting display for assisting an operator in making correct change during a transaction. The number and denomination of money to be returned as change is displayed. In one embodiment, the display is in the form of indicators mounted in each money bin of the cash drawer.

Some teller workstations include a money dispenser attached to the computer controlled workstation to automatically dispense an amount of money in a mix of denominations for return to a consumer or bank customer as part of a transaction. The bill mixes are usually calculated using the straight top down its Approach.

U.S. Pat. No. 4,532,417 also by Nishimura et al. relates to a cash accounting system for bank window systems having a dispenser for dispensing denominations that are available in the dispenser. Also provided is a manual handling instruction unit that specifies the denomination breakdown of money to be dispensed manually in order to dispense the correct total amount.

U.S. Pat. No. 4,185,646, by Woods et al. describes a control circuit for a multi-denomination cash dispenser to dispense a denomination mix in a shortest amount of time. It also is intended to equalize wear and deplete denomination inventories at an equal rate., IBM Technical Disclosure Bulletin Volume 27, No. 2, July 1984, Page 924 describes a minimum number of bills and coins dispensing computer method and apparatus. The program recursively calls itself as often as needed to find all possible denomination mixes that result in fewer bills and coins than that calculated by a top down method.

The above prior art does not solve a problem of how to handle unusual denominations such as commemorative denominations and foreign currencies. Further, the prior art does not describe how to prevent certain denominations from being prematurely depleted when the denominations are dispensed according to a consumers wishes while using algorithms that attempt to equalize wear and deplete denomination inventories at an equal rate as described by Woods et al. cited above.

SUMMARY OF THE INVENTION

The invention advantageously interactively monitors the amount of cash present in a teller cash drawer and in addition, the precise bill mix available for a transaction, thereby helping a financial institution to track teller cash positions more exactly, while reducing the input requirements for an operator who must hurry to serve a line of customers.

A further advantage of the invention allows an operator to conveniently respond to a consumers request for specific denominations while at the same time minimizing premature depletion of specific denominations of money.

An even further advantage of the invention is that it augments the standard topdown bill mix algorithm, which dispenses as much of each denominations it can starting with the higher denominations down to the lower ones, by correcting situations where a denomination is not an integral multiple of the next lower denomination thereby allowing a mix to be determined even when a lower denomination is depleted.

These and other advantages are obtained by the invention which provides a system and method including a programmed computer process for alleviating portions of the tedious input requirements posed by structured bill counting procedures. An interactive denomination control dialog with input assistance accepts individual denomination bill and coin quantities or amounts from the teller or operator and automatically calculates the total amount as input is received. The specific denominations of bills and coins are configurable for many different currencies.

When a specific amount of money is to be dispensed, the invention selects quantities and denominations to be dispensed. Each quantity and the amount of a denomination can be changed by a teller or other operator. After a change, the system of the invention modifies quantities of smaller denominations to be dispensed in order to dispense the specific amount.

The method and system of the invention solves the imbalance problem where an amount is to be dispensed from a cash drawer made up of a fixed number of denominations, each having an associated item quantity, by distributing the number of items dispensed from each available denomination, in a substantially even distribution across many transactions. It uses a three pass approach where the first pass tries to dispense an amount using an equal number of items from each denomination whose total is less than or equal to the required amount. Afterwards, the selected quantities of any unavailable, or nearly depleted, cash drawer denominations are reduced. It then attempts to make up any difference by using a topdown approach on the remaining total not distributed across denominations to get to the required amount.

BRIEF DESCRIPTION OF THE DRAWINGS

The preferred exemplary embodiment of the present invention will hereinafter be described in conjunction with the appended drawings, where like designations denote like elements, and:

FIG. 3 shows the orientation of FIGS. 3A and 3B.

DETAILED DESCRIPTION OF A PREFERRED EMBODIMENT OF THE INVENTION

Figure 1:
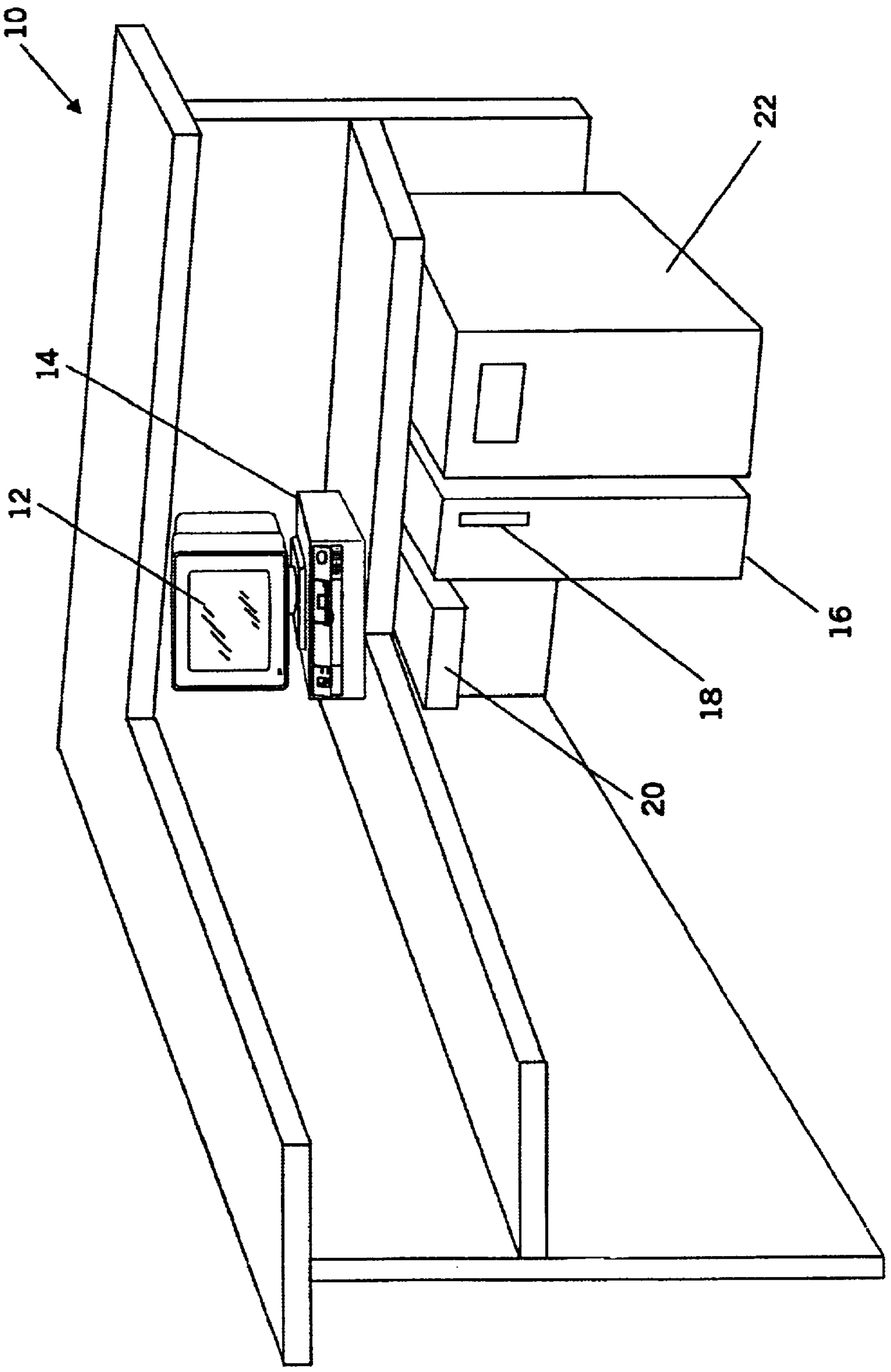
FIG. 1 depicts a workstation system in accordance with a preferred embodiment of the invention.

Referring now to the figures, FIG. 1 depicts a computer workstation 10 according to a preferred embodiment of the invention. Workstation 10 includes a display screen 12 and a keyboard 14. The workstation is controlled by a computer 16 having a media slot 18 for receiving a disc or other form of media which contains the programmed logic of the invention. After loading the media into slot 18, the workstation is configured and controlled by the programmed logic on the media to perform the steps of the invention which assist the teller in receiving and dispensing money, keeping track of the amount and denomination of the money while minimizing the data entry burden placed upon the teller.

Money is actually dispensed from a cash drawer 20 and/or alternately from a cash dispensing machine 22. Cash drawer 20 may be stand alone or it may be connected to computer 16. If cash drawer 20 is connected to computer 16, it may be controlled to open only when the amount and denominations to be dispensed have been satisfactorily determined by the method of the invention. Likewise, a dispenser 22 is controlled by the programmed logic of the invention to dispense the quantity of the selected denominations determined by the method of the invention.

Referring again to FIG. 1, a consumer may approach a workstation according to the invention with an amount of money for deposit. When the amount specified is a cash-in amount, the denomination adjustment is inhibited since the teller has to enter the exact bill and coin mix that is received from the customer. Instead, the invention provides an input dialog that accepts individual denomination bill and coin quantities or amounts from the teller and automatically accumulates the total amount as the input is received. Attempting to "assist" the teller in this situation by anticipating denominations would be construed as guesswork since the bill and coin mix received from if, a consumer are fixed. Thus the total quantity of items of money of each denomination is continually tracked including both deposited and dispensed items.

Figure 2:
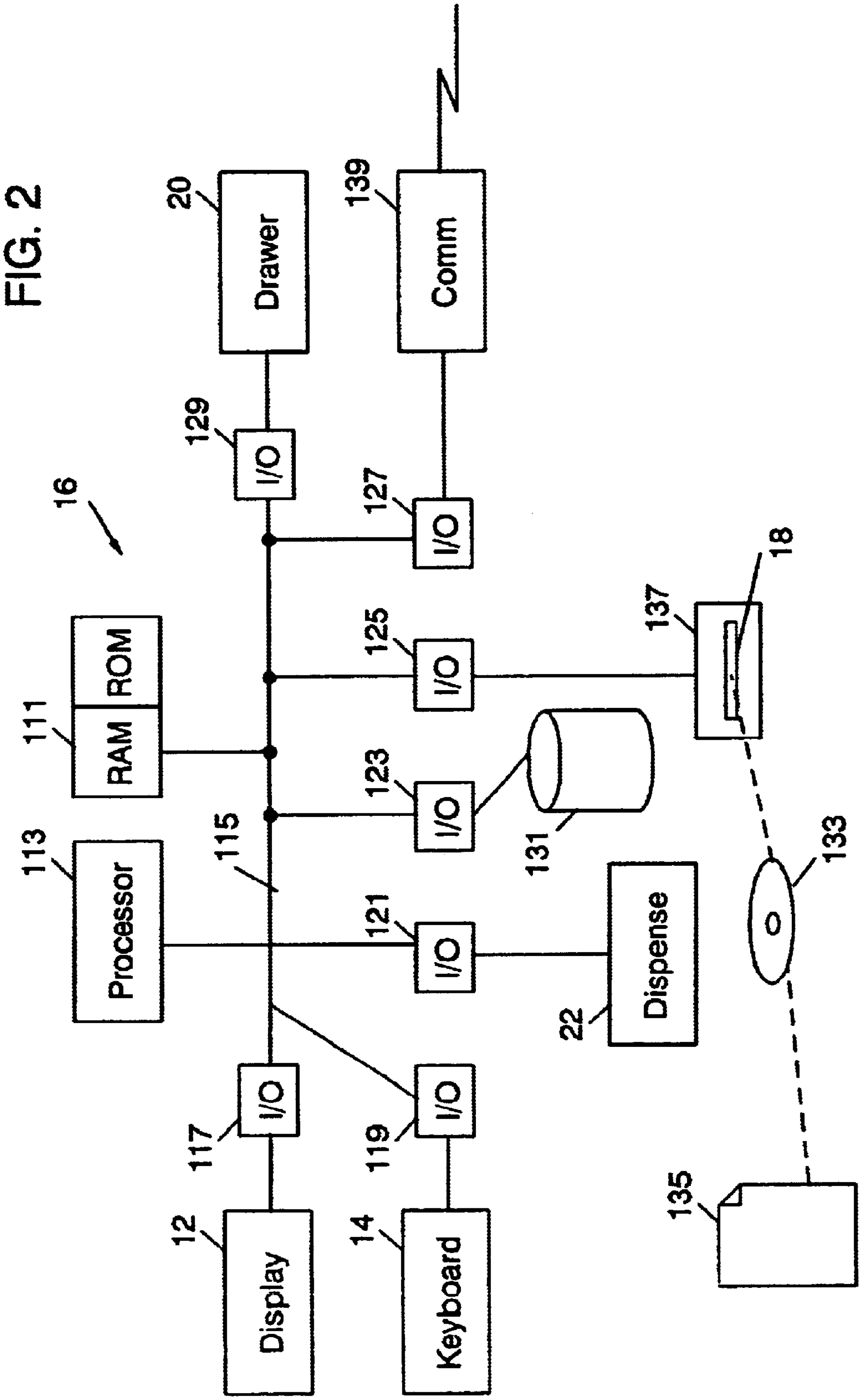
FIG. 2 depicts a block diagram of a computer system and program in accordance with a preferred embodiment of the invention.

Referring now to FIG. 2, a preferred embodiment of the computer system 16 of the invention is shown comprising random access memory 111, a central processing unit (CPU) 113, bus 115 and input output (I/O) adapters 117 through 129. Memory 111 may comprise any known type of data storage and/or transmission media, including magnetic media, optical media, random access memory (RAM), read-only memory (ROM), a data object, etc. Moreover, memory 111 may reside at a single physical location, comprising one or more types of data storage, or be distributed across a plurality of physical systems in various forms. CPU 113 may likewise comprise a single processing unit, or be distributed across one or more processing units in one or more locations, e.g., on a client and server, but are usually located in a single building or branch location. I/O 117 through 129 may comprise any known type of input output device circuitry and program control code. Adapter 117 connects display 12. Adapter 119 connects keyboard 14. Adapter 121 connects dispenser 22. Adapter 123 connects a direct access storage device such as mass storage disk drive 131. Adapter 125 connects the media reader 137 having slot 18 which receives media 133 containing programmed logic 135. Adapter 127 connects a communication device such as a modem or local area network 139. Adapter 129 connects a cash drawer 20 to computer 16. Bus 115 provides a communication link between each of the components in the computer system 16 and likewise may comprise any known type of transmission link, including electrical, optical, radio, etc. In addition, although not shown, additional components, such as cache memory, etc., may be incorporated into computer system 16.

It is understood that the present invention can be realized in hardware, and/or a combination of hardware and software. A denomination adjustment system according to the present invention can be realized in a centralized fashion in one computer system of a single workstation, or it may be realized in a distributed fashion where different elements are spread across several interconnected computer systems. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods. Computer program, software program, or denomination adjustment software, in the present context mean any expression, in any language, code or notation, of a set of instructions intended to cause a system having an information processing capability to perform a particular function either directly or after either or both of the following: (a) conversion to another language, code or notation; (b) reproduction in a different material form.

The instant invention alleviates some of the tedious input requirements posed by structured bill counting procedures. The invention provides an input dialog that accepts an amount to be dispensed from a transaction program and determines individual denomination bill and coin quantities to be dispensed. Both denomination quantity and amounts are accepted from a teller who wishes to modify the quantity and denomination of money dispensed and the invention automatically adjusts other quantities and denominations as necessary to dispense the required amount. In addition to a required amount field, the invention displays a dispense total amount field as the denomination and quantity input is received from a teller and the adjustment steps of the invention.

Figure 4:
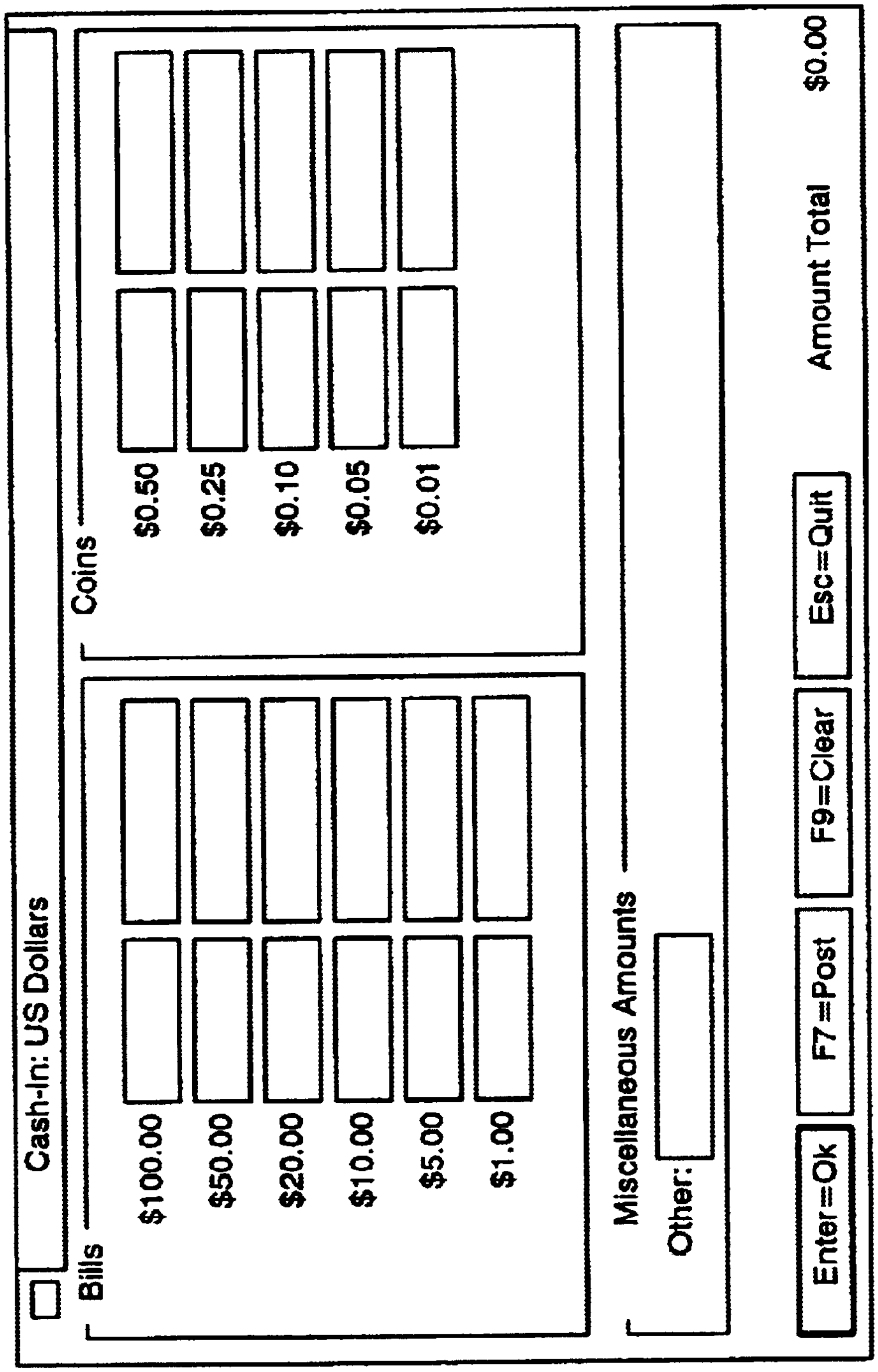
FIG. 4 is an example display for denomination selection.

A typical blank cash deposit dialog display for U.S. dollars is shown in FIG. 4. The denominations are listed high to low in value and are traversed using the tab key in this same order. The bill quantity or amount may be entered, depending upon teller preference. Whichever is entered, the other is automatically calculated for the user. A miscellaneous amount field is provided and is usually used for cash received in non-standard denominations such as two dollar bills and/or Susan B. Anthony dollar coins, etc. The miscellaneous amount is simply added in to the total amount as another denomination amount value.

Figure 3A:
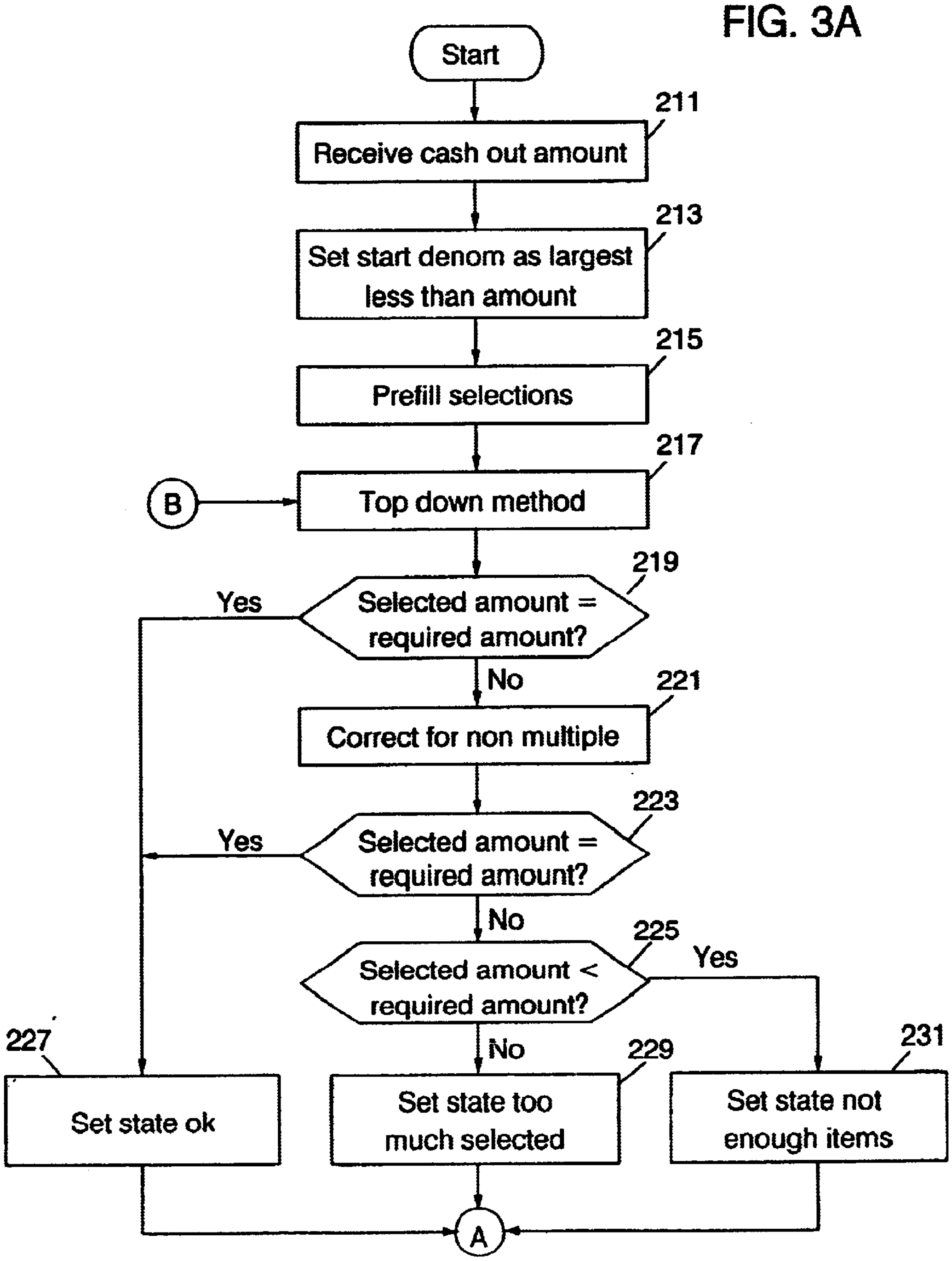
FIGS. 3A and 3B are a flow diagram showing a preferred embodiment of the method of the invention.
Figure 3B:
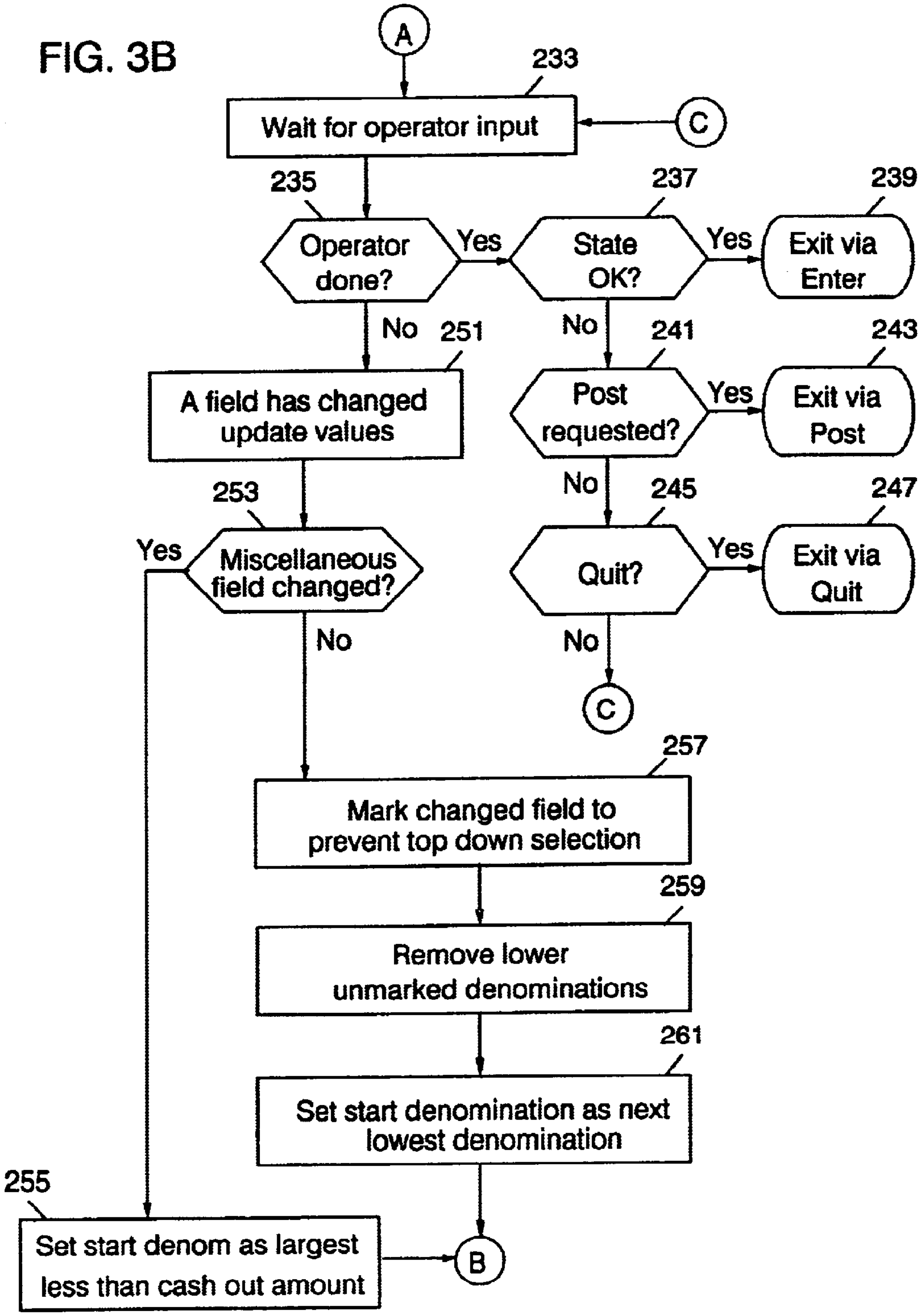

FIG. 3 shows how FIGS. 3A and 3B are connected.

Figure 5:
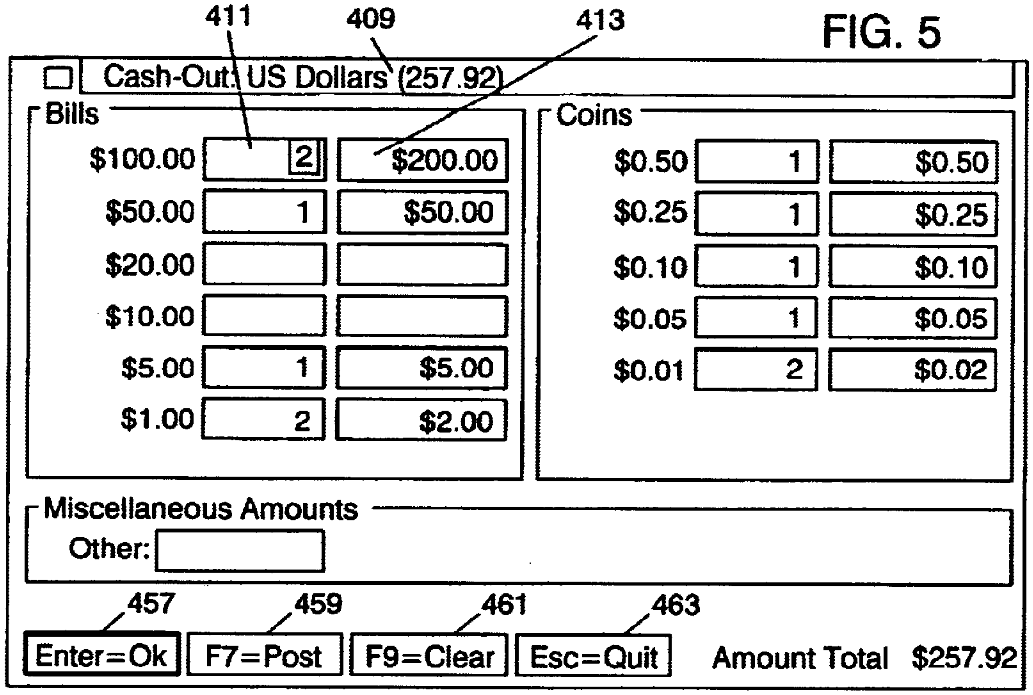
FIG. 5 is another example of a denomination selection dialog with preselected denomination quantities via steps 211 though 233 of FIG. 3A.

For cash-out amounts, teller interactive data input assist dialog is enabled, and is used to make suggestions for the bill and coin mix to be dispensed as the teller data input is received. Referring now to FIG. 3A, the method of the invention receives, as a parameter from a calling transaction program, the required amount at step 211. At step 213, the method sets a starting denomination to the largest denomination in preparation to generate a suggested denomination mix at block 215. As shown in FIG. 5, when the dialog is first presented, the bill quantities are automatically filled in with values to reach the required amount. An even distribution method is used as represented in step 215 whereby each denomination is filled in with an optimum quantity starting with the highest denomination down to the lowest until the amount value is reached. The even distribution method will be described in further detail later in this specification.

The cash drawer counts are also considered in this determination so as to not attempt to dispense more of a denomination than is available. In a refinement of this method, the method also reduces the quantity of a denomination to be dispensed when the count of available items of that denomination is significantly less than the count of other lower denominations that are available to make up the mix of denominations. For example, when a count of a first denomination is less than one half of the count of the next lower denomination, a quantity of one is deleted from the quantity of the first denomination to be dispensed and a multiple of the next lower denomination is presented in place of the deleted quantity of the first denomination. In this way the available denominations are depleted more evenly by compensating for previously dispensed denominations that were selected by consumers in previous transactions.

The even distribution selection is completed in block 217 where the amount represented by deleted denomination items is made up using a top down selection method. At block 219, the selection amount is tested to determine if the required total dispense amount has been reached.

If the determination is positive, the yes output leads to block 231 where the state of this process is set to OK. If the selection amount is less than the required amount, it could be that way because of a non-multiple denomination in the order of denominations. This situation is addressed at block 221 where a higher denomination item is deleted in order to allow dispensing from lower denominations. The operation of the method in block 221 is described in greater detail later in this specification.

At block 223, the selection amount is tested again to determine if the required total dispense amount has been reached. If the exact amount has been reached, the flow again goes to block 227. If the exact amount has not been reached, block 225 tests whether the selection amount is less than or greater than the required amount. When the selection amount is greater than required, flow goes to block 229. Operation within block 229 then proceeds as will be described later in more detail with respect to FIG. 9. If the selection amount is lower than the required amount, flow goes to block 231 where the system waits at block 233 for the teller to act. As will be described in more detail later with respect to FIG. 10, the teller may override the required amount with the denomination selection determined total, by pressing the "F7-Post" pushbutton 1059 or a function key such as F7. Such action will cause the transaction application program to modify other amounts such as a deposit amount to permit the transaction to go forward.

At block 233 in FIG. 3B, the method waits for denomination quantity or amount input from a teller while block 235 continually tests for keyboard or push button input. If the enter=OK push button 457 of FIG. 5 is pressed it is detected at block 237 and the method terminates at block 239, advising the transaction application program of the dispense amount. If the POST button 459 is pressed, it is detected at 241 and the method returns at block 243 but may require the transaction to be modified. If the QUIT push button 463 is pressed, it is detected at block 245 and the selected amounts are set to zero and the method returns at block 247 to the transaction application without a dispense amount or denominations selected.

If the input from the teller was a field change instead of a method ending push button, block 251 will remove the prefilled or previous teller entered value and substitute the new value. At block 253, the method detects whether the field that changed is the miscellaneous field. If it was the miscellaneous field, flow goes to block 255 where the starting denomination is set as the largest denomination. Method flow then progresses via connection B to block 217 in FIG. 3A for further selection of denominations to make up the remaining amount as required.

If the miscellaneous field was not changed but another denomination field was changed, the method goes to block 257 where the field is marked as changed. The method will not use this field when determining further denomination selections. At block 259 all lower denomination fields are set to zero unless they had also been marked as changed by the teller in block 257 above. In block 261, the starting denomination is set as the next lower denomination and the method returns to block 217 in FIG. 3A.

FIG. 5 shows an example cash-out start-up dialog for dispensing $257.92. The cursor is placed in the quantity input field 411 for the highest denomination available. As depicted in block 217 of FIG. 3A, the teller may type over this prefilled value or tab to the next field. As a prefilled quantity field, or a prefilled amount field such as field 413, is typed over, the bill quantities for all lower denominations are adjusted by the blocks 251, 255, 259, 261 and 217 of FIGS. 3A and 3B to make up the original required dispense amount shown in field 409. The example shown in FIG. 6 shows how the dialog will appear when a teller deletes the default prefilled $100 bill quantity value in field 411.

Figure 6:
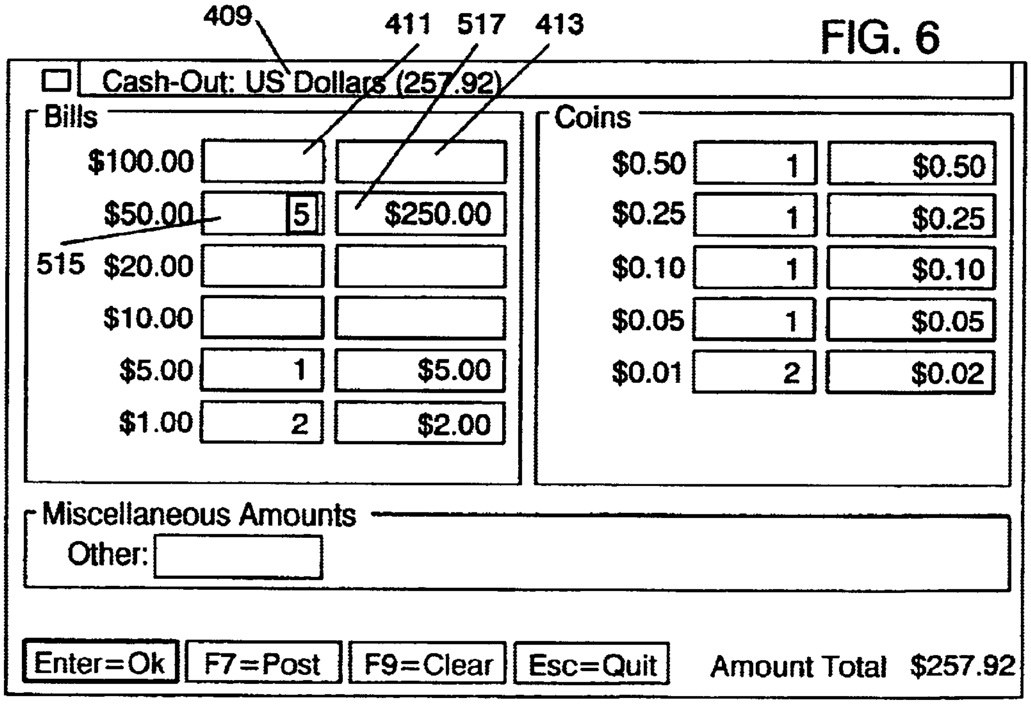
FIG. 6 is another example of a denomination selection dialog executing steps 233 through 217 to 233 of FIGS. 3A and 3B.
Figure 7:
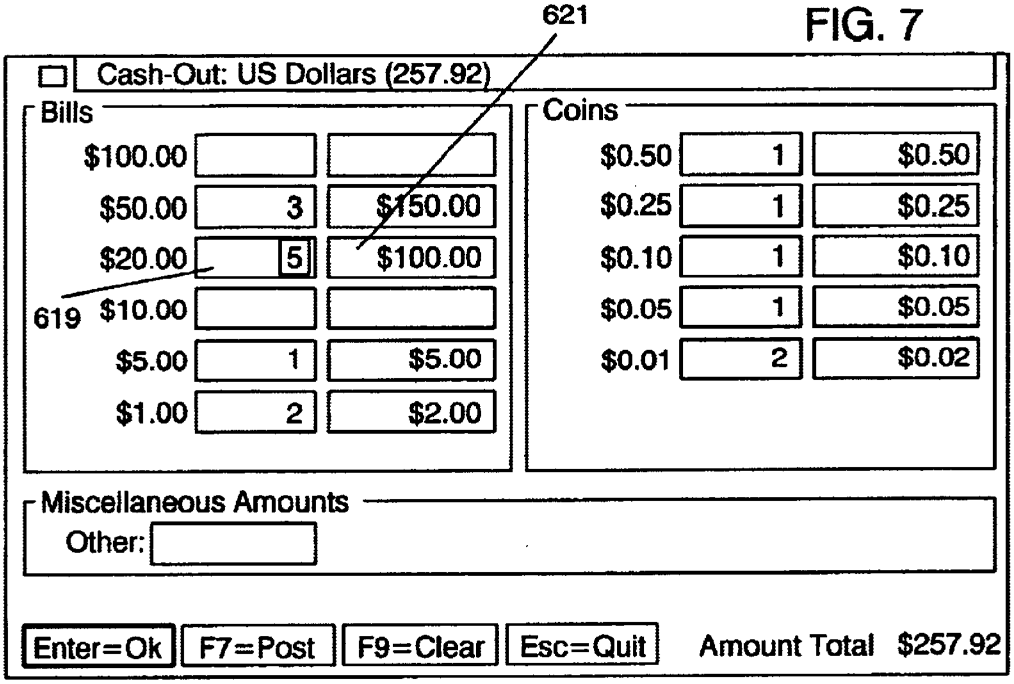
FIG. 7 is another example of a denomination selection dialog executing steps 233 through 217 to 233 of FIGS. 3A and 3B.

Referring now to FIG. 6, notice that the quantity of 2 that was removed from the $100 quantity field 411 has been made up in $50 bills by the entry of the numeral five in field 515. 10 Now when a teller types a numeral three over the five in the $50 quantity field 515, the method blocks 251, 255, 259, 261 and 217 of FIGS. 3A and 3B further modify the dialog as appears in FIG. 7.

With reference then to FIG. 7, notice that the amount to be dispensed that was represented in the two removed $50 bills has been made up by increasing the quantity of $20 bills to be dispensed from zero to five. Also notice that the higher denomination $100 bill quantity in field 411 was not increased to account for removal of the two fifty dollar bills. This is because the method has passed the one hundred dollar quantity entry field 411 when the fifty dollar quantity field was changed. The method of the invention only adjusts denominations that are lower in value than the modified quantity. Now if the teller reduces the twenty dollar bill quantity in field 619 from five to three, the dialog display is changed as appears in FIG. 8.

Figure 8:
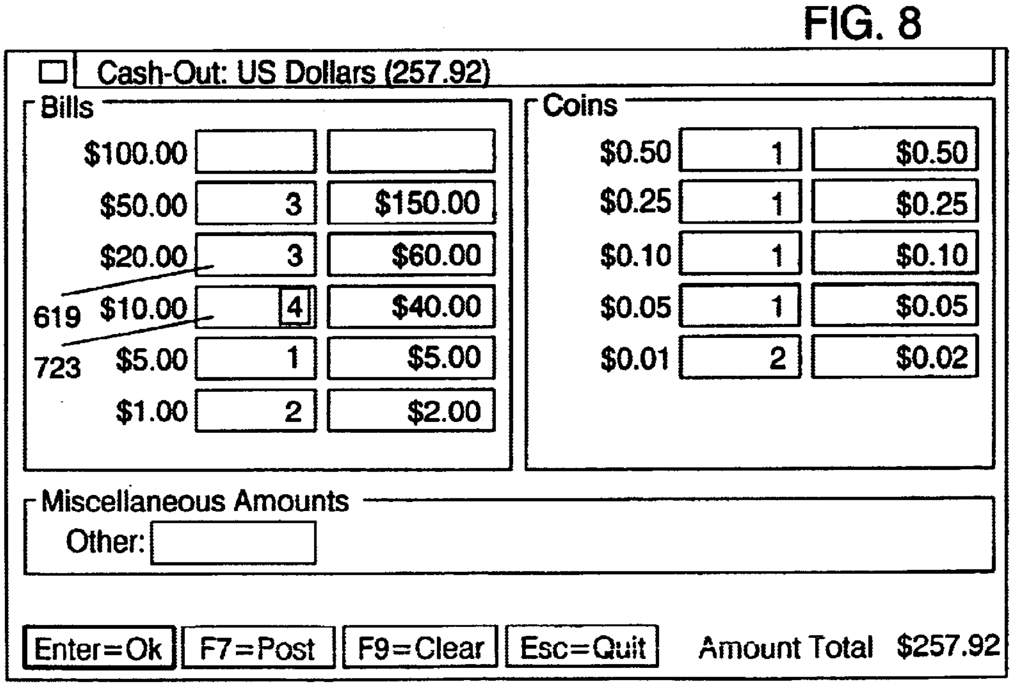
FIG. 8 is another example of a denomination selection dialog executing steps 233 through 217 to 233 of FIGS. 3A and 3B.

Referring now to FIG. 8, it will be seen that the change in field 619 has caused the quantity in field 723 to go from zero to four. Continuing, if the teller then drops the $10 bill quantity of four in field 723 to a quantity of three, the dialog will appear as shown in FIG. 9.

Figure 9:
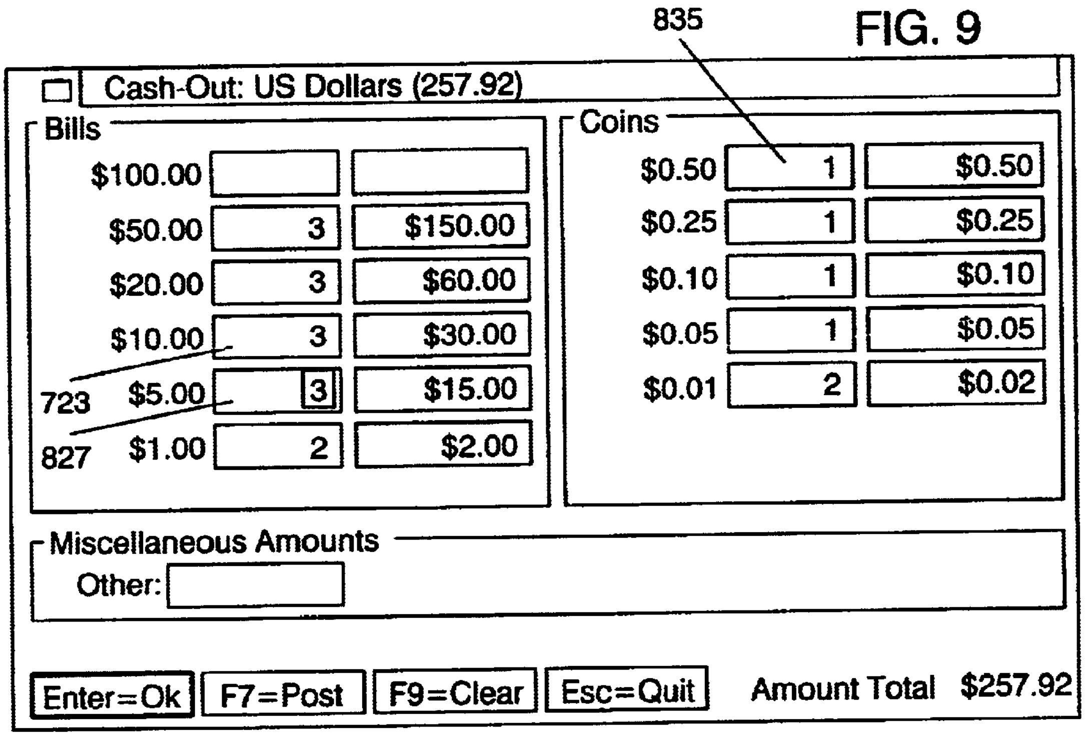
FIG. 9 is another example of a denomination selection dialog executing steps 233 through 217 to 233 of FIGS. 3A and 3B.
Figure 10:
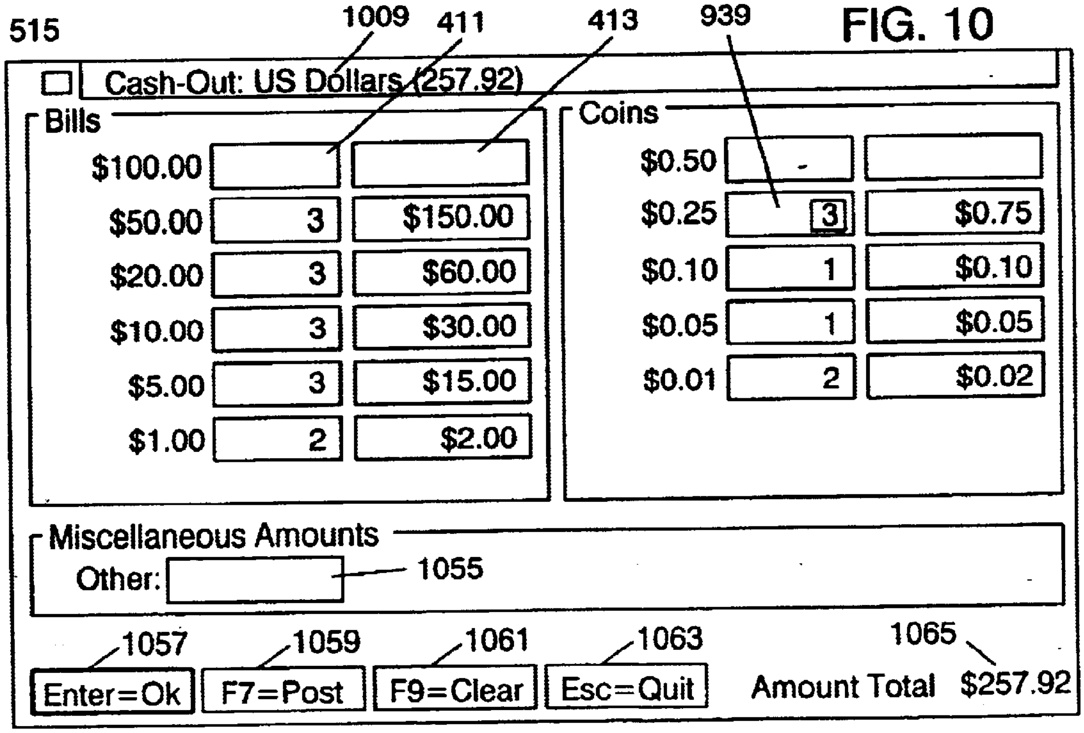
FIG. 10 is another example of a denomination selection dialog executing steps 233 through 217 to 233 of FIGS. 3A and 3B.

With reference to FIG. 9, the teller may for example, tab forward and delete the fifty cent quantity in field 835, which converts to quarters as shown in FIG. 10. As can be seen, the teller data entry assist feature of the instant invention helps the teller determine out how to dispense the required amount without significantly increasing data entry labor. Usually, a teller need only overwrite a few prefilled input quantity values to come up with an acceptable mix of denominations to be dispensed.

When because of teller modification to prefilled quantity fields 411, 515 etc. or amount fields, 413, 517 etc., the input quantities exceed those required to make up the dispense amount, lower denomination quantity and amount fields are set to zero and automatic adjustment is disabled until the quantities in higher denomination fields are changed by the teller to quantities that are below that which make up the required dispense amount.

Once the denomination quantity inputs are completed, the teller presses the "Enter=OK" pushbutton 1057, or the enter key on the keyboard to accept the bill and coin quantities as valid. The dialog proceeds in this situation by first verifying that the specified quantities produce a value matching the amount required shown in fields 1009 and second, that the teller cash drawer contains the required number of bills and coins in the specified denominations. If either validation fails, a message is displayed to inform the teller of the problem and the denomination control dialog continues. Otherwise the denomination control dialog is dismissed and the invoking transaction application program continues by processing its input values.

To terminate the denomination control dialog without accepting the input quantities, the teller simply presses the "Esc=Quit" push button 1063 or escape key on the keyboard. Blocks 245 and 247 of FIG. 3B then return to the transaction application without a selection.

If the total amount does not match the required amount but the teller would like to override the required amount with the denomination selection determined total, then the "F7-Post" pushbutton 1059 or a function key such as F7 can be pressed. This action by a teller at blocks 241 and 243 of FIG. 3B posts the determined dispense amount in field 1065 that was determined by the denomination quantities selected during the input dialog, back to the invoking transaction application program.

Finally, the F9=CLEAR pushbutton 1061 or the F9 function key on the keyboard may be pressed to cause all inputs to be cleared. This is used to reset the dialog to a clean state should the user inputs be unacceptable for any reason.

A further description of the even distribution method represented in step 215 of FIG. 3 will now be described. This method solves a problem where an amount is to be dispensed from a cash drawer made up of a fixed number of denominations, each having an associated item count. The method operates to evenly distribute the number of items dispensed from each available denomination. It uses a three pass approach where the first pass tries to dispense an amount using an equal number of items from each denomination whose total is less than or equal to the required amount. Afterwards, any unavailable denomination quantities are reduced to their available cash drawer counts. It then attempts to make up any difference by using a topdown approach on the remaining total not selected to get to the required amount.

For purposes of illustration certain terms will be defined. For example the required dispense amount will be referred to as T. If there are n different denominations, these denominations will be referred to as D1, D2, D3, . . . Dn, with each Di representing a denomination value (ie: $100, $50, $20, . . . ). For each Di, there will be an associated cash drawer count for that denomination, C1, C2, C3, . . . Cn, which represents the number of items of each denomination in the cash drawer.

An object of the method of the invention is to select items of selected denominations from the cash drawer such that the total value of the mix comes as close to the required total amount, T, as possible. The individual item quantities are referred to as Q1, Q2, Q3, . . . Qn, each one representing the number of items of the corresponding denomination to be dispensed in order to achieve the desired amount T.

In generic terms, the result can be expressed as:

$$T=D1*Q1+D2*Q2+D3*Q3+\ldots+Dn*Qn$$

The quantities, Qi, are restricted by the available denomination counts, Ci, that is:

$$Q1<=C1,\ Q2<=C2,\ Q3<=C3,\ \ldots\ Qn<=Cn$$

In this manner, the method will not dispense more of a particular denomination than is currently in the cash drawer. For simplification, also assume that the denominations are ordered in descending value as shown in the dialog FIGS. 4 through 10.

$$D1>=D2>=D3>=\ldots>=Dn$$

Note the "greater than or equals" as opposed to just "greater" which allows for two denominations of the same value. This may occur in monetary systems where a paper note sometimes has a coin equivalent (ie: a $1 bill and a $1 coin).

Since the denomination values and total amount are known elements, the solution to the bill mix problem involves selecting a set of Qi values to meet the required dispense amount in field 1009, using the above described constraints.

The method starts by applying the first pass to the required amount, ignoring any cash drawer counts for the time being. The method first accumulates the sum of available denominations, each of whose values is less than the desired amount T. This accumulated sum is designated as S and can be determined as follows:

$$S=D1+D2+D3+\ldots+Dn$$

Now to determine the distributed quantity, E, the method does an integer division of the required total, T, by the accumulated denomination sum, S as follows:

$E=T \bmod S$

In plain English, E is the integer portion of the division of the total amount by the accumulated denomination sum. This quantity, when applied to each denomination, yields a dispense amount in field 1065 which should be less than or equal to the required dispense amount, T in field 409, and is expressed as follows:

$$T>=E*D1+E*D2+E*D3+\ldots+E*Dn$$

Pass two requires that any denomination quantities that are not available as counts in cash drawer 20 be removed. This gives remaining availability quantities at each denomination or Ai. The method assigns to each Ai quantity, the lesser of the distributed quantity, E, or the available count, Ci, that is:

$$A1=\min(E, C1), A2=\min(E, C2), A3=\min(E, C3), \ldots An=\min(E, Cn)$$

Now the method substitutes the available denomination counts for the even distribution amount at each individual denomination position to arrive at the net amount, N, which represents the best guess amount that can be reached with a pure even distribution. N can be expressed as follows:

$$N=A1*D1+A2*D2+A3*D3+\ldots+An*Dn$$

This net amount, N, will again be less than or equal to the required amount, T. The difference between these two values represents the amount that must still be issued to complete the denomination mix. M represents this make-up amount as follows:

$$M=T-N$$

The method also reduces the individual denomination bill counts, Ci, by the quantity dispensed so far at each denomination, Ai. The remaining denomination counts are referred to as "Ri" which can be expressed as follows:

$$R1=C1-A1, R2=C2-A2, R3=C3-A3, \ldots, Rn=Cn-An$$

The last step in this method is to use a simple topdown bill mix method shown in FIG. 3A block 217 to make-up the difference not met by the even distribution method so far. This involves determining the maximum number of bills required at each denomination, starting with the highest denomination down to the lowest. The make-up amount is reduced by the amount dispensed after each denomination quantity is determined.

Ki represents the quantity required for denomination Di and Mi is the make-up amount left after removal of this denomination quantity. Ki and Mi are determined as follows:

$$K1=\min(R1, M \bmod D1), M1=M-K1*D1$$

$$K2=\min(R2, M1 \bmod D2), M2=M1-K2*D2$$

$$K3=\min(R3, M2 \bmod D3), M3=M2-K3*D3$$

$$Ki=\min(Ri, M_{1-1} \bmod Di), Mi=M_{1-1}-Ki*Di$$

In English, each Ki is the lesser of the remaining availability count and the integer division of the remaining make-up amount by the denomination value. Mi is the difference between the previous make-up amount, Mi−1, and the amount consumed at this denomination, Ki*Di. Note that denominations must be evaluated in descending order (highest to lowest) for this method to work correctly.

Once the make up quantities, Ki have been determined, they are added to the previously determined availability quantities, Ai, to get the total required denomination quantities, Qi, as follows:

$$Q1=A1+K1, Q2=A2+K2, Q3=A3+K3, \ldots, Qi=Ai+Ki$$

This is the denomination mix that best satisfies the required amount, T, given the available counts at each denomination. Note that if certain bills are lacking in cash drawer 20, the total required amount in field 1009 may not be reached by this method.

The top down denomination mix method steps with non-multiple adjustments of block 221 in FIG. 3A will now be described. This method solves a problem where an amount is to be dispensed from a cash drawer made up of a fixed number of denominations, each having an associated item count. The method increases the opportunity to successfully dispense a requested amount shown in field 1009 of FIG. 10. It augments a standard topdown denomination mix method of block 217, which dispenses as much of each denomination as it can starting with the higher denominations down to the lower ones, by correcting situations where a denomination is not an integral multiple of the next lower denomination.

For example, if a teller is dispensing $60 from a cash drawer 20 that contains 1-$50, 3-$20, and 0-$10 bills, the standard top down approach fails because when it apportions out the $50 bill, there are no tens left to make up the difference to $60. If the method were to pass on acquiring the $50 bill, it would succeed by taking the three $20 bills. This is referred to as a non-multiple adjustment since $50 is not an integral multiple of the next lower denomination, $20.

For purposes of description, the dispense amount is again designated as T. Assume for this example that there are n denominations. These denominations are referred to as D1, D2, D3, . . . Dn, with each Di representing a denomination value (ie: $100, $50, $20, . . . ). For each Di, there will be an associated cash drawer count for that denomination, C1, C2, C3, . . . Cn, which represents the number of items of each denomination in the cash drawer 20.

The objective is to select an item mix for each denomination from the cash drawer such that the total value of the mix comes as close to the required total amount, T, as possible. Refer to the individual item quantities as Q1, Q2, Q3, . . . Qn, each one representing the number of items of the corresponding denomination to be dispensed in order to achieve the desired amount T.

In generic terms, the result can be expressed as:

$$T=D1*Q1+D2*Q2+D3*Q3+\ldots+Dn*Qn$$

The quantities, Qi, are restricted by the available denomination counts, Ci, that is:

$$Q1<=C1, Q2<=C2, Q3<=C3, \ldots Qn<=Cn$$

In this manner, the method can not dispense more of a particular denomination than is currently in the cash drawer 20. For simplification, again assume that the denominations are ordered in descending value, that is:

$$D1>=D2>=D3>=\ldots>=Dn$$

Since the denomination values and total amount are known elements, denomination and quantity selection involve selecting a set of Qi values to meet the required amount given the above constraints.

The method described earlier above with respect to block 215 involves going through each denomination in descending order of value, and selecting an optimum number of bills from that denomination that 1) are available in the cash drawer 20 and 2) does not exceed the designated amount.

Once a selection, Qi, is made using a particular denomination Di, the denomination value is removed from the total amount, yielding a remainder amount, Ri. This remainder amount is then used as the total amount for the next denomination found in the descending order path.

In general, this can be expressed as follows:

$$R1=T-Q1*C1,\ R2=R1-Q2*C2,\ \ldots\ Rn=Rn-1-Qn*Cn$$

Qi is then determined as follows:

$$Qi=\min(Ri-1 \bmod Di,\ Ci)$$

In plain English, Qi is always the lesser of the integer portion of the division of the previous remainder by the denomination value and the current cash drawer count for that denomination.

The object of :the process is to minimize the value of Rn so that the various Qi quantities dispense as close as possible, the entire total amount. Ideally, Rn should be zero meaning that the denomination item mix satisfies the total amount required completely. However, there are complications that can arise that render an imperfect solution.

The first complication, and most trivial, is that there may, in fact, not be enough cash in the drawer to meet the required amount. If the object is to dispense $500 and there is only $416.73 in cash drawer 20, the process will never be able to dispense the correct amount using any known process steps. There is nothing that can be done about this problem since there is simply not enough money available.

The second, and more pervasive, complication involves the presence of "non-multiples" in the denomination list. For example, consider a denomination sequence, D1, D2, . . . Dn, where each Di is an integral multiple of the following denomination value, Di+1. In this situation, selecting the maximum available count from each denomination in descending order will always provide the least demand on subsequent denominations and hence reveal the best possible solution. Best in this case does not necessarily mean most evenly distributed.

The problem arises when one denomination, Di, is not an integral multiple of the following denomination, Di+1. Selecting the maximum Qi, in this situation, might render a remainder, Ri that does not make the most effective amount from which to extract the Di+1 denomination.

Consider the following cash drawer contents:

| Bills | | Coins | |
|---|---|---|---|
| D1 = $100.00 | C1 = 4 | D7 = $1.00 | C7 = 1 |
| D2 = $50.00 | C2 = 9 | D8 = $0.50 | C8 = 2 |
| D3 = $20.00 | C3 = 10 | D9 = $0.25 | C9 = 3 |
| D4 = $10.00 | C4 = 0 | D10 = $0.10 | C10 = 4 |
| D5 = $5.00 | C5 = 2 | D11 = $0.05 | C11 = 0 |
| D6 = $1.00 | C6 = 2 | D12 = $0.01 | C12 = 2 |

Note the absence of $10 bills and nickels in the denomination counts. Using a value of $267.56 and applying the straight topdown approach the following results are achieved:

| Quantity Determinations | Remainders |
|---|---|
| Q1 = min (267.56 mod 100.00, 4) = 2, | R1 = 67.56 |
| Q2 = min (67.56 mod 50.00, 9) = 1, | R2 = 17.56 |
| Q3 = min (17.56 mod 20.00, 10) = 0, | R3 = 17.56 |
| Q4 = min (17.56 mod 10.00, 0) = 0, | R4 = 17.56 |
| Q5 = min (17.56 mod 5.00, 2) = 2, | R5 = 7.56 |
| Q6 = min (7.56 mod 1.00, 2) = 2, | R6 = 5.56 |
| Q7 = min (5.56 mod 1.00, 1) = 1, | R7 = 4.56 |
| Q8 = min (4.56 mod 0.50, 2) = 2, | R8 = 3.56 |
| Q9 = min (3.56 mod 0.25, 3) = 3, | R9 = 2.81 |
| Q10 = min (2.81 mod 0.10, 4) = 4, | R10 = 2.41 |
| Q11 = min (2.41 mod 0.05, 0) = 0, | R11 = 2.41 |
| Q12 = min (2.41 mod 0.01, 2) = 2, | R12 = 2.39 |

The topdown method came up $2.39 short of reaching the required amount.

By locating the non-multiples in the denomination sequence, and converting them into lower denominations, it may be possible to make the method work. In the example, the non-multiples happen to be $50 bills and $0.25 quarters (50 is not divisible by 20 and 0.25 is not divisible by 0.10).

Starting with the $50 bills, since one of them exists in the denomination mix, it can be removed and then the topdown method can redetermine the mix as follows:

| NM | Quantity Determinations | Remainders |
|---|---|---|
| | Q1 = min (267.56 mod 100.00, 4) = 2, | R1 = 67.56 |
| -> | Q2 = min (67.56 mod 50.00, 9) = 0, | R2 = 67.56 |
| | Q3 = min (67.56 mod 20.00, 10) = 3, | R3 = 7.56 |
| | Q4 = min (7.56 mod 10.00, 0) = 0, | R4 = 7.56 |
| | Q5 = min (7.56 mod 5.00, 2) = 1, | R5 = 2.56 |
| | Q6 = min (2.56 mod 1.00, 2) = 2, | R6 = 0.56 |
| | Q7 = min (0.56 mod 1.00, 1) = 0, | R7 = 0.56 |
| | Q8 = min (0.56 mod 0.50, 2) = 1, | R8 = 0.06 |
| -> | Q9 = min (0.06 mod 0.25, 3) = 0, | R9 = 0.06 |
| | Q10 = min (0.06 mod 0.10, 4) = 0, | R10 = 0.06 |
| | Q11 = min (0.06 mod 0.05, 0) = 0, | R11 = 0.06 |
| | Q12 = min (0.06 mod 0.01, 2) = 2, | R12 = 0.04 |

While this modification still came up 4 cents short, it recovered a lot of the amount from the original run ($0.04 is a lot less than $2.39).

Now the same thing will be done with the next non-multiple, the quarter. However, notice quarters have not been selected, either the original mix or the subsequent mix after removing the $50 bill. Since there are no quarters yet in the mix, the method must generate quarters by converting higher denominations into quarters and then removing a quarter to begin the non-multiple adjustment.

In this situation, the next higher denomination that was dispensed is the 50 cent piece. Starting with the $50 removed from the mix, then take out the 50 cent piece that was selected and convert it into two quarters. Then remove one of the quarters and proceed with the topdown approach for the remaining denominations as follows:

| NM | Quantity Determinations | Remainders |
|---|---|---|
| | Q1 = min (267.56 mod 100.00, 4) = 2, | R1 = 67.56 |
| -> | Q2 = min (67.56 mod 50.00, 9) = 0, | R2 = 67.56 |
| | Q3 = min (67.56 mod 20.00, 10) = 3, | R3 = 7.56 |
| | Q4 = min (7.56 mod 10.00, 0) = 0, | R4 = 7.56 |
| | Q5 = min (7.56 mod 5.00, 2) = 1, | R5 = 2.56 |
| | Q6 = min (2.56 mod 1.00, 2) = 2, | R6 = 0.56 |

-continued

| NM | Quantity Determinations | Remainders |
|---|---|---|
| | Q7 = min (0.56 mod 1.00, 1) = 0, | R7 = 0.56 |
| | Q8 = min (0.56 mod 0.50, 2) = 0, | R8 = 0.56 |
| -> | Q9 = min (0.56 mod 0.25, 3) = 1, | R9 = 0.31 |
| | Q10 = min (0.31 mod 0.10, 4) = 3, | R10 = 0.01 |
| | Q11 = min (0.01 mod 0.05, 0) = 0, | R11 = 0.01 |
| | Q12 = min (0.01 mod 0.01, 2) = 1, | R12 = 0.00 |

The result of these substitutions allowed us to completely select the entire required amount, something the simple topdown method could not do!

Clearly, the simple topdown method does not suffice for many currencies. As long as governments continue to make 50's and 20's and quarters and dimes, this problem will exist so the simple topdown method will result in incomplete amount selections.

It should also be noted that non-multiple substitution may degrade the results of a simple topdown method. For example, if the above amount were 257.56 instead of 267.56, removing a fifty dollar bill would take the simple topdown remainder from 4 cents to $2.39.

A simple test can be made at the non-multiple slot to see if removal of a denomination at that position can improve the results. To determine the existence of a non-multiple, divide the denomination value, Di, by the next denomination down the line, Di+1. This yields an integer quotient, I, and multiple remainder, M such that $Di=I*D_{i+1}+M$. The value M reflects the amount that can be made up by removing a currency at this position. If the remainder after performing the topdown method at slot i is less than the multiple remainder, then removal at this position will not improve the mix.

In the above example, the remainder at the $50 slot was. $17.56. The multiple remainder is $10.00 ($50=2*$20+ $10). Since $10.00 is less than $17.56, the removal of a fifty dollar bill can improve the mix (though it may not depending on subsequent denomination quantities). Were the total amount $257.56 instead of $267.56, the remainder at the $50 slot would have been $7.56 which is less than $10.00 and removing a fifty dollar bill would not improve the mix.

The non-multiple adjustment algorithm described above will not work for certain denomination sets. These denomination sets specifically have values that contain several non-multiples and they cannot be recovered in lower denominations as easily. An example would be a denomination set containing a $7, $3, and $2 bill. Fortunately, modern currencies do not contain such denominations and the non-multiple denomination adjustment will work just fine on most modern currencies.

Upon removing a non-multiple denomination, the top down method must be carried through to completion for the remaining denominations before another removal is attempted. This allows the subsequent bill quantities to completely absorb the effect of the bill removal so that other non-multiple removals can be attempted.

After each non-multiple removal, the result is tested against previous passes and the best pass is selected. This is necessary since the remainder test described above does not ensure that there will be lower denominations to make up the non-multiple amount removed. A degraded bill mix may still result. However, the only way to test the results is to go topdown to completion, since it cannot be determined if the removal will improve the result, only that it most definitely won't improve the result.

The variations and additions to the preferred embodiment of the invention are described above by way of example and it will be understood that other changes in form and detail may be may to embodiments of the invention without departing from the spirit and scope thereof which is measured by the following claims.

We claim:

1. A program product having computer readable code stored on a recordable media for creating an interactive cash management system comprising:

programmed means for receiving data input of a quantity of items of a denomination of money by an operator;

programmed means for receiving data input of an amount of money of a denomination by an operator;

programmed means for accumulating a total money value as a quantity and denomination of items of money are input by the operator;

programmed means for displaying the quantity and denomination and amount of the items of money input and for displaying the accumulated total money value;

programmed means for posting the accumulated total money value amount and a running total of a count and denomination of items of money available for dispensing;

programmed means for displaying indications of possible denominations of money to be dispensed;

programmed means for displaying a quantity input field and an amount input field in a vicinity of each displayed indication of possible denomination;

programmed means for displaying an amount required field; and programmed means for displaying a total amount selected field;

programmed input assist means for receiving a data input of a required amount of money to be dispensed, the programmed input assist means operating in three passes;

a first pass determining a selection of denominations to comprise a required amount;

a second pass to delete denomination items to obtain optimum denomination depletion; and a third pass using a top down method for making up amounts removed during the second pass, the programmed input assist means automatically filling in quantity input fields in the vicinity of such denomination indications so that filled in quantity input fields of denomination indications make up the required amount of money to be dispensed;

programmed means for displaying to the operator, the automatically filled in quantity input fields in the vicinity of such denomination indications.

2. The program product of claim 1 further comprising:

programmed means for determining that a total amount selected is not equal to a total amount required to be dispensed;

programmed means responsive to the programmed means for determining, when a total amount selected is not equal to a total amount required, to reduce a quantity of a selected item of a denomination when the denomination is not an integer multiple of a next smaller denomination; and programmed means using a top down method for making up amounts removed by the reduction of the quantity of the selected item by selecting quantities of items of smaller denominations.

3. A computer workstation having computer readable code stored on a recordable media for creating an interactive cash management system comprising:

means for receiving data input of a quantity of items of a denomination of money by an operator;

means for receiving data input of an amount of money of a denomination by an operator;

means for accumulating a total money value as a quantity and denomination of items of money are input by the operator;

means for displaying the quantity and denomination and amount of the items of money input and for displaying the accumulated total money value;

means for posting the accumulated total money value amount and a running total of a count and denomination of items of money available for dispensing;

means for displaying indications of possible denominations of money to be dispensed;

means for displaying a quantity input field and an amount input field in a vicinity of each displayed indication of possible denomination;

means for displaying an amount required field;

means for displaying a total amount selected field; and input assist means for receiving a data input of a required amount of money to be dispensed, the input assist means operating in three passes;

a first pass determining a selection of denominations to comprise a required amount;

a second pass to delete denomination items to obtain optimum denomination depletion; and a third pass using a top down method for making up amounts removed during the second pass;

the input assist means automatically filling in quantity input fields in the vicinity of such denomination indications so that filled in quantity input fields of denomination indications make up the required amount of money to be dispensed means for displaying to the operator, the filled in quantity input fields in the vicinity of such denomination indications.

4. The computer workstation of claim 3 further comprising:

means for determining that a total amount selected is not equal to a total amount required to be dispensed;

means responsive to the means for determining, when a total amount selected is not equal to a total amount required, to reduce a quantity of a selected item of a denomination when the denomination is not an integer multiple of a next smaller denomination; and means using a top down method for making up amounts removed by the reduction of the quantity of the selected item by selecting quantities of items of smaller denominations.

5. A method for interactively managing cash comprising the steps of:

receiving data input of a quantity of items of a denomination of money by an operator;

receiving data input of an amount of money of a denomination by an operator;

accumulating a total money value as a quantity and denomination of items of money are input by the operator;

displaying the quantity and denomination and amount of the items of money input and for displaying the accumulated total money value;

posting the accumulated total money value amount and a running total of a count and denomination of items of money available for dispensing;

displaying indications of possible denominations of money to be dispensed;

displaying a quantity input field and an amount input field in a vicinity of each displayed indication of possible denomination;

displaying an amount required field; and displaying a total amount selected field;

receiving a data indicating a required amount of money to be dispensed;

automatically filling in quantity input fields in a vicinity of denomination indications so that filled in quantity input fields of denomination indications make up the required amount of money to be dispensed, the step of automatically filling in quantity input fields in a vicinity of denomination indications further comprising three passes:

a first pass determining a selection of denominations to comprise a required amount;

a second pass to delete denomination items to obtain optimum denomination depletion; and a third pass using a top down method for making up amounts removed during the second pass;

displaying to the operator, the filled in quantity input fields in the vicinity of such denomination indications.

6. The method of claim 5 further comprising the steps of:

determining that a total amount selected is not equal to a total amount required to be dispensed;

in response to the step of determining, when a total amount selected is not equal to a total amount required, reducing a quantity of a selected item of a denomination when the denomination is not an integer multiple of a next smaller denomination; and selecting quantities of items of smaller denominations using a top down method for making up amounts removed by reduction of the quantity of the selected item.

* * * * *